United States Patent [19]

Fredin

[11] Patent Number: 5,452,915
[45] Date of Patent: Sep. 26, 1995

[54] ANTI-ROLL DRIVER SIDE AIRBAG TETHER

[75] Inventor: Steven R. Fredin, Rochester Hills, Mich.

[73] Assignee: Morton International, Inc., Chicago, Ill.

[21] Appl. No.: 302,163

[22] Filed: Sep. 8, 1994

[51] Int. Cl.⁶ .................................................. B60R 21/16
[52] U.S. Cl. ................................................... 280/743.2
[58] Field of Search ........................... 280/743 A, 743 R, 280/731, 728 R, 728 A, 729, 730 R, 743.2, 743.1, 731, 728.1, 728.2, 729, 730.1

[56] References Cited

U.S. PATENT DOCUMENTS

| | | | |
|---|---|---|---|
| 3,910,597 | 10/1975 | Seko | 280/731 |
| 4,449,728 | 5/1984 | Pilatzki | 280/731 |
| 5,249,825 | 10/1993 | Gordon et al. | 280/743 A |
| 5,253,892 | 10/1993 | Satoh | 280/731 |
| 5,358,273 | 10/1994 | Onishi et al. | 280/743 R |

FOREIGN PATENT DOCUMENTS

| | | | |
|---|---|---|---|
| 0586131 | 3/1994 | European Pat. Off. | 280/743 A |
| 4142326 | 6/1993 | Germany | 280/743 R |
| 0247242 | 10/1989 | Japan | 280/743 A |
| 4283145 | 10/1992 | Japan | 280/728 R |
| 2263448 | 7/1993 | United Kingdom | 280/743 A |

Primary Examiner—Margaret A. Focarino
Assistant Examiner—Peter C. English
Attorney, Agent, or Firm—George W. Rauchfuss, Jr.; Gerald K. White

[57] ABSTRACT

A driver's side airbag has an internal tether to prevent displacement forwardly of, or upwardly from, the steering wheel. The tether has one end secured substantially centrally of the bottom of the bag. The other end is secured in the peripheral seam joining the bottom and top halves of the bag and at a location forward of the steering wheel.

10 Claims, 1 Drawing Sheet

U.S. Patent     Sep. 26, 1995     5,452,915

ANTI-ROLL DRIVER SIDE AIRBAG TETHER

TECHNICAL FIELD

This invention relates to automotive airbags. More particularly, it relates to an airbag having a novel tether arrangement.

BACKGROUND ART

It is not unusual to employ tethers in automotive airbags to retain them in position. A drivers' side airbag is normally positioned within the steering wheel and, when inflated, forms a substantially circular cushion to absorb the impact of a driver's head and chest. Conventionally, airbags of this type include an internal tether or flexible strap. The tether is secured at one end to the bottom layer portion of the airbag in a substantially central position. The other end of the tether is secured to the center of the top layer portion of the airbag. Airbags of this type function relatively successfully in a standard automobile application. However, problems arise when such airbags are installed in vehicles whose steering columns form angles greater than approximately 25° to the horizontal. Examples of such steering columns are those found in vans and trucks. When an unbelted driver makes contact with an inflated bag of this type, there is a tendency for the airbag to roll forward or up around the central tether causing the driver to make contact with the unprotected steering wheel. Accordingly, it is a primary object of the present invention to provide a tether having novel attachment points to better restrain the inflated airbag. Other objects, features, and advantages will become apparent from the following description and appended claims.

DISCLOSURE OF INVENTION

In accordance with the present invention, the attachment point of a tether is moved from the top central portion of an airbag to the side seam joining the top and bottom portions. This attachment point is on a forward periphery of the bag relative to the vehicle.

BEST MODE FOR CARRYING OUT THE INVENTION

Figure 1:
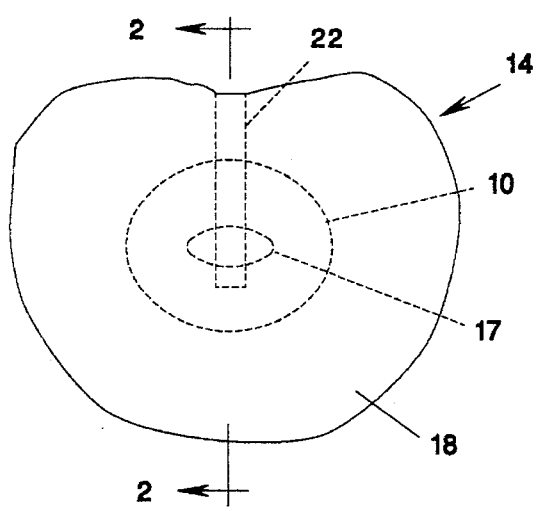
FIG. 1 is a plan view of an inflated airbag having a tether in accordance with the present invention.
Figure 2:
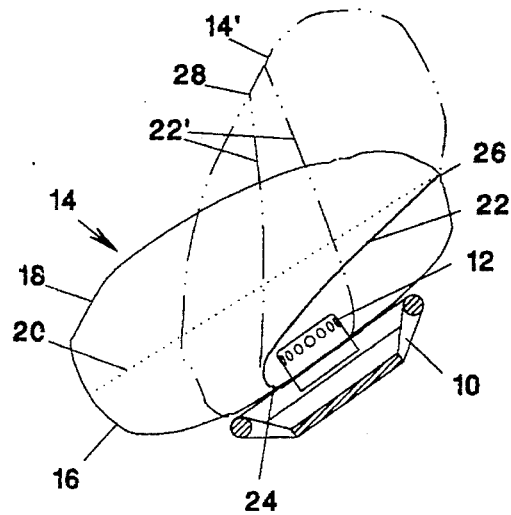
FIG. 2 is a cross-section taken substantially along the line 2—2 of FIG. 1 also illustrating in phantom the action of a conventional prior art airbag.

With particular reference to FIGS. 1 and 2, there is illustrated a steering wheel 10 within which is mounted an airbag module including an inflator 12. The airbag module is not illustrated in detail because it is conventional and its features are well-known to those skilled in the art.

The airbag 14 is also conventional. It is generally a cushion formed from a basically circular base portion 16 and a similar top portion 18 joined, as by sewing, by an encircling seam 20 around the periphery of the two portions. The base portion 16 is provided with a central opening 17 for receiving an inflator 12. Such an airbag, when inflated, covers a steering wheel from a region extending from forward of the steering wheel to rearward of the steering wheel. In accordance with the present invention, a tether 22 has a first end which is anchored at a point 24 substantially centrally of base portion 16 and a second end which is secured at a point 26 in the encircling seam 20. Anchor point 24 is on a side of the opening 17 opposite seam point 26 so that tether 22 extends across the opening 17 and the inflator 12. It is also important to note that the point to which the tether is secured is forward of the steering wheel in a direction toward the windshield and away from the driver. As a result, when the airbag 14 is inflated as illustrated in FIG. 2, the tether 22 has basically straightened to its full extent, thereby retaining the airbag in the proper position covering the steering wheel 10.

A phantom view on FIG. 2 illustrates the problem with the prior art construction. In this configuration the tether 22' is secured to a point 28 substantially at the center of the top layer portion of the airbag 14'. Accordingly, when this tether straightens out, it does not restrain forward movement of the airbag. Upon impact by the driver, it may be forced forwardly into the illustrated position, exposing the steering wheel.

Figure 3:
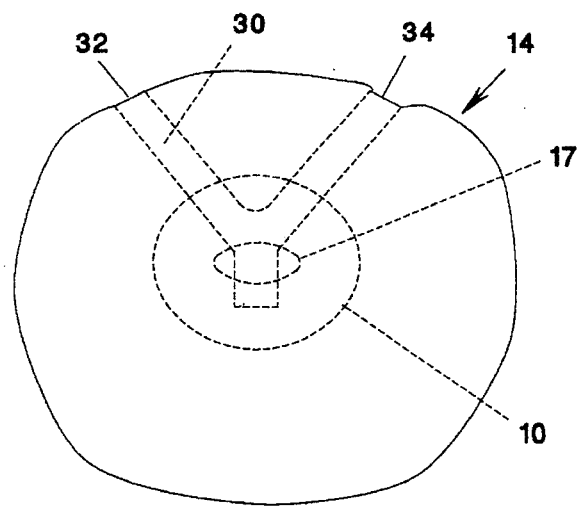
FIG. 3 is a view similar to that of FIG. 1 illustrating a modified tether.
Figure 4:
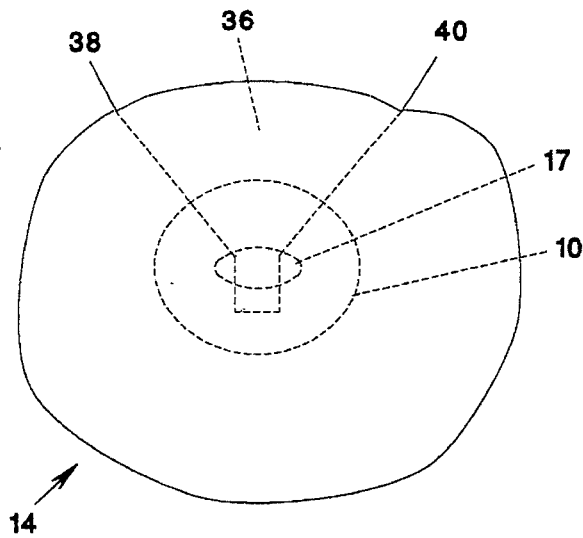
FIG. 4 is a view similar to that of FIG. 1 of a still further modification.

Modifications of this invention are illustrated in FIGS. 3 and 4. The modification of FIG. 3 illustrates a Y-shaped tether 30. The two arms of the Y terminate in the seam at spaced locations 32, 34. It has been found that, for optimum results, these spaced locations should not be much greater than 90° apart as measured from the center of the airbag or from the anchored first end of the tether.

FIG. 4 illustrates a still further modification wherein the tether 36 is fan shaped and is embedded in the seam between the two extreme points 38, 40 which similarly define an angle, preferably not substantially in excess of 90°.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. In a driver's side automotive airbag mounted within a steering wheel and including a base portion having a central opening for receiving an inflator and a top portion joined to said base portion by an encircling peripheral seam to form a cushion inflatable to cover said steering wheel and extending from a region forward of said steering wheel to a region rearward of said steering wheel, the improvement which comprises:

a flexible tether enclosed within said cushion and having a first end anchored substantially centrally of said base portion and a second end secured in said peripheral seam at said forward region and wherein the first end of the flexible tether anchored substantially centrally of the base portion is anchored on a side of the central opening such that the flexible tether extends across the central opening.

2. The improvement of claim 1 wherein the second end of said tether is wider than the first end to span an angle along said seam relative to the anchored first end of up to approximately 90°.

3. The improvement of claim 1 wherein said tether has multiple second ends spaced along said seam to span an angle relative to the anchored first end of up to approximately 90°.

4. The improvement of claim 3 wherein said multiple is two.

5. The improvement of claim 1 wherein the driver's side automotive airbag is mounted within a steering wheel of a steering column forming an angle greater than about 25° to horizontal.

6. In a driver's side automotive airbag module including an inflator and an airbag mounted within a steering wheel, the airbag including a base portion having a central opening receiving the inflator and a top portion joined to said base portion by an encircling peripheral seam to form a cushion inflatable to cover said steering wheel and extending from a region forward of said steering wheel to a region rearward of said steering wheel, the improvement which comprises:

a flexible tether enclosed within said cushion and having a first end anchored substantially centrally of said base portion and a second end secured in said peripheral seam at said forward region and wherein the first end of the flexible tether anchored substantially centrally of the base portion is anchored on a side of the central opening such that the flexible tether extends across the central opening.

7. The improvement of claim 6 wherein the second end of said tether is wider than the first end to span an angle along said seam relative to the anchored first end of up to approximately 90°.

8. The improvement of claim 6 wherein said tether has multiple second ends spaced along said seam to span an angle relative to the anchored first end of up to approximately 90°.

9. The improvement of claim 8 wherein said multiple is two.

10. The improvement of claim 6 wherein the driver's side airbag module is mounted within a steering wheel of a steering column forming an angle greater than about 25° to horizontal.

* * * * *

UNITED STATES PATENT AND TRADEMARK OFFICE
CERTIFICATE OF CORRECTION

PATENT NO.  : 5,452,915
DATED       : September 26, 1995
INVENTOR(S) : Steven R. Fredin It is certified that error appears in the above-indentified patent and that said Letters Patent is hereby corrected as shown below:

Column 2, line  9, "note that the point" should be
              --note that the point 26--.

Column 2, line 10, "steering wheel" should be
              --steering wheel 10,--.

Signed and Sealed this

Eighteenth Day of June, 1996

Attest:

BRUCE LEHMAN

Attesting Officer    Commissioner of Patents and Trademarks